US010198281B2

(12) United States Patent
Thakkar et al.

(10) Patent No.: US 10,198,281 B2
(45) Date of Patent: Feb. 5, 2019

(54) HYBRID INFRASTRUCTURE PROVISIONING FRAMEWORK TETHERING REMOTE DATACENTERS

(71) Applicant: VMWARE, INC., Palo Alto, CA (US)

(72) Inventors: Sachin Thakkar, Palo Alto, CA (US);
Debashis Basak, Palo Alto, CA (US);
Abhinav Vijay Bhagwat, Pune (IN);
Narendra Kumar Basur Shankarappa, Palo Alto, CA (US);
Serge Maskalik, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 301 days.

(21) Appl. No.: 15/137,023

(22) Filed: Apr. 25, 2016

(65) Prior Publication Data

US 2017/0060615 A1    Mar. 2, 2017

Related U.S. Application Data (60) Provisional application No. 62/211,665, filed on Aug. 28, 2015.

(30) Foreign Application Priority Data

Jan. 5, 2016   (IN) .............................. 201644000319

(51) Int. Cl.
*G06F 9/455*   (2018.01)
*H04L 12/24*   (2006.01)
(Continued)

(52) U.S. Cl.
CPC ............ *G06F 9/45558* (2013.01); *G06F 8/60* (2013.01); *G06F 9/5027* (2013.01); *H04L 12/46* (2013.01); *H04L 41/02* (2013.01); *H04L 41/08* (2013.01); *H04L 67/025* (2013.01); *H04L 67/10* (2013.01); *H04L 67/1004* (2013.01); *H04L 67/22* (2013.01); *H04L 67/28* (2013.01); *H04L 67/42* (2013.01); *H04L 69/324* (2013.01);
(Continued)

(58) Field of Classification Search
None
See application file for complete search history.

(56) References Cited

U.S. PATENT DOCUMENTS

| | | | |
|---|---|---|---|
| 2013/0185413 A1* | 7/2013 | Beaty .................... | G06F 9/5072 709/224 |
| 2014/0108665 A1* | 4/2014 | Arora .................... | H04L 67/141 709/227 |
| 2015/0295731 A1* | 10/2015 | Bagepalli ............ | H04L 12/6418 370/401 |

* cited by examiner

*Primary Examiner* — Qing Yuan Wu
(74) *Attorney, Agent, or Firm* — Patterson & Sheridan LLP (57) ABSTRACT

Techniques are disclosed for deploying and maintaining appliances in a hybrid cloud computing system which includes an on-premise data center and a public cloud computing system configured to provide a common platform for managing and executing virtual workloads. Appliances to be deployed may include those required (or useful) for hybrid operations, including a cloud gateway appliance, a wide area network (WAN) optimizer, a layer 2 (L2) concentrator, and a mobility agent that handles virtual machine (VM) migration traffic. Such appliances are deployed first on the on-premise data center, and remote jobs are then sent to the public cloud to deploy the same appliances thereon. After deployment, the appliances deployed on the on-premise data center and corresponding appliances on the public cloud share configuration states and may further be wired together to communicate via secure encrypted tunnels.

20 Claims, 4 Drawing Sheets

(51) Int. Cl.
  *H04L 12/46* (2006.01)
  *G06F 9/50* (2006.01)
  *H04L 29/08* (2006.01)
  *G06F 8/60* (2018.01)
  *H04L 29/06* (2006.01)
  *H04L 29/14* (2006.01)
(52) U.S. Cl.
  CPC ...... *H04L 69/40* (2013.01); *G06F 2009/4557* (2013.01); *G06F 2009/45595* (2013.01)

HYBRID INFRASTRUCTURE PROVISIONING FRAMEWORK TETHERING REMOTE DATACENTERS

CROSS-REFERENCE TO RELATED APPLICATIONS

This Application claims benefit of U.S. Provisional Patent Application Ser. No. 62/211,665 filed Aug. 28, 2015, which is incorporated herein by reference in its entirety.

RELATED APPLICATIONS

Benefit is claimed under 35 U.S.C. 119(a)-(d) to Foreign application Serial No. 201644000319 filed in India entitled "HYBRID INFRASTRUCTURE PROVISIONING FRAMEWORK TETHERING REMOTE DATACENTERS", on Jan. 5, 2016, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. The use of such public cloud services is typically kept separate from the use of existing computing resources in data centers managed by an enterprise. With an increasing trend in migrating data centers to cloud platforms, there is an increasing demand for a hybrid model that combines public cloud services and data center computing resources.

SUMMARY

One embodiment disclosed herein provides a computer-implemented method for deploying appliances in a hybrid cloud computing system including a data center and a public cloud. The method generally includes learning parameters of a public cloud environment. The method further includes receiving a user selection of appliances to deploy in the hybrid, cloud computing system, deploying the selected appliances on a data center, and transmitting one or more jobs to deploy corresponding appliances remotely on the public cloud. In addition, the method includes deploying the corresponding appliances on the public cloud based on the jobs and the learned parameters, and sharing configuration states for the appliances and the corresponding appliances between the data center and the public cloud.

Further embodiments of the present invention include a computer system configured to carry out the above method, and a non-transitory computer-readable storage medium comprising instructions that cause the computer system to carry out the above method.

DETAILED DESCRIPTION

Embodiments presented herein provide techniques for deploying and maintaining virtual appliances in a hybrid cloud computing system which includes an on-premise data center and a public cloud computing system configured to provide a common platform for managing and executing virtual workloads. As used herein, a "virtual appliance" (also referred to simply as an "appliance") refers to an image of a virtual computing instance, e.g., a virtual machine (VM) that employs a guest operating system or a container that does not employ a guest operating system, that includes one or more applications and a preconfigured virtual environment or platform. Appliances to be deployed in the hybrid cloud computing system may include those required (or useful) for hybrid operations on the on-premise data center and public cloud, such as a cloud gateway appliance that manages external public IP addresses, routes network traffic, and provides networking services: a wide area network (WAN) optimizer that increases data transfer efficiencies between the on-premise data center and the public cloud: a layer 2 (L2) concentrator that enables L2 network extensions: and a mobility agent that handles virtual machine (VM) migration traffic. Such appliances are deployed first on the on-premise data center, and remote jobs are then sent to the public cloud to deploy the same appliances on the cloud. Doing so creates, on the cloud side, a symmetric view of the appliances that were deployed on the on-premise data center. After deployment, the appliances deployed on the on-premise data center and corresponding appliances on the public cloud share configuration states and may further be wired together to communicate via secure encrypted tunnels.

Figure 1:
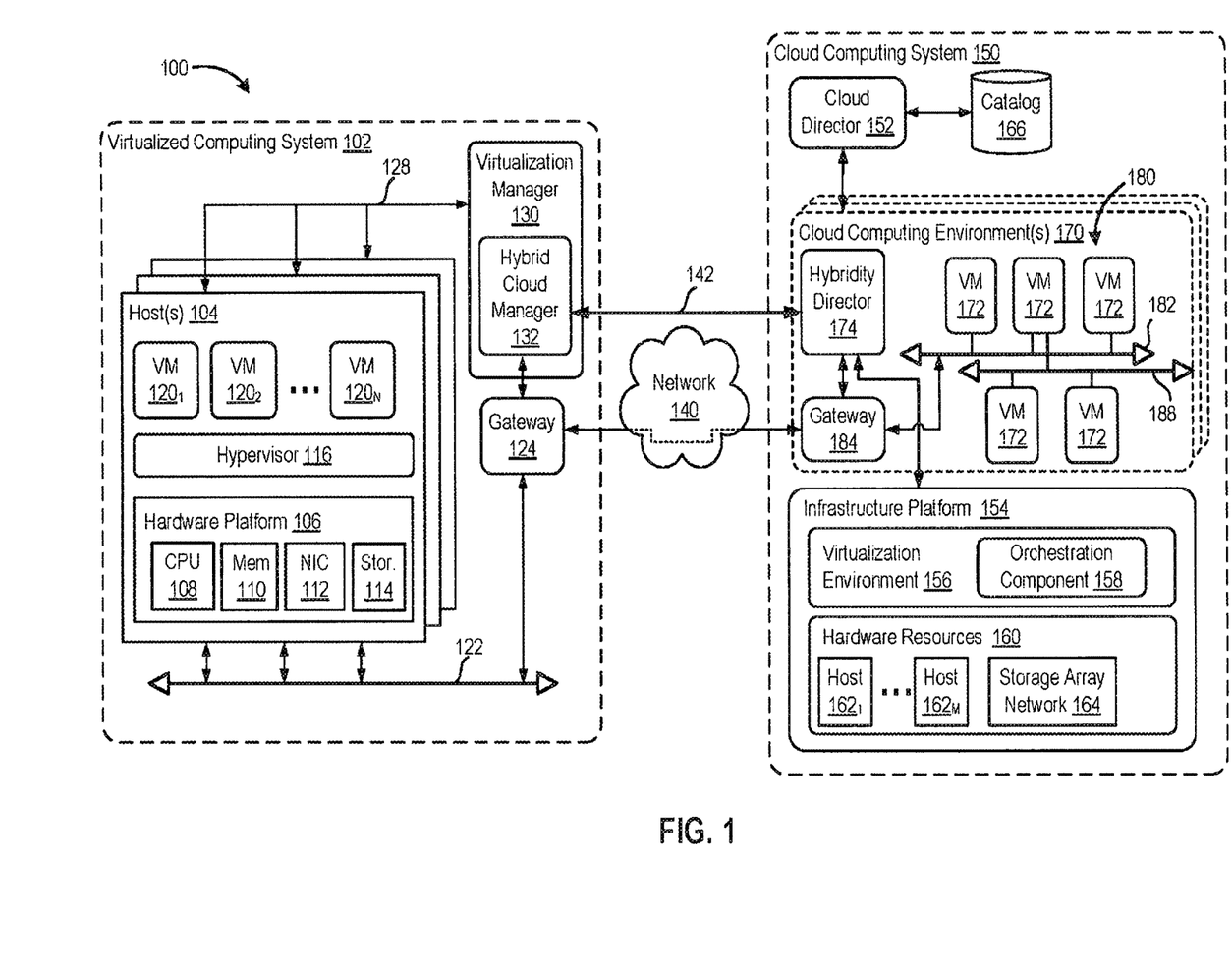
FIG. 1 is a block diagram of a hybrid cloud computing system in which one or more embodiments of the present disclosure may be utilized.

FIG. 1 is a block diagram of a hybrid cloud corn in the hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, also referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 128. In one embodiment, virtualization manager 130 is a computer program that resides and executes in a central server, which may reside in virtualized computing system 102, or alternatively, running as a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs, including appliance VMs, in cloud computing system 150, transfer VMs from virtualized computing system 102 to cloud computing system 150, and perform other "cross-cloud" administrative task, as described in greater detail later. In one embodiment, hybrid cloud manager 132 may be a "meta" service providing workflows at runtime to achieve what caller services need to be done, such as the deploying and maintaining of appliance VMs in hybrid cloud computing system 100. In one embodiment, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xera® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing, environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 188 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
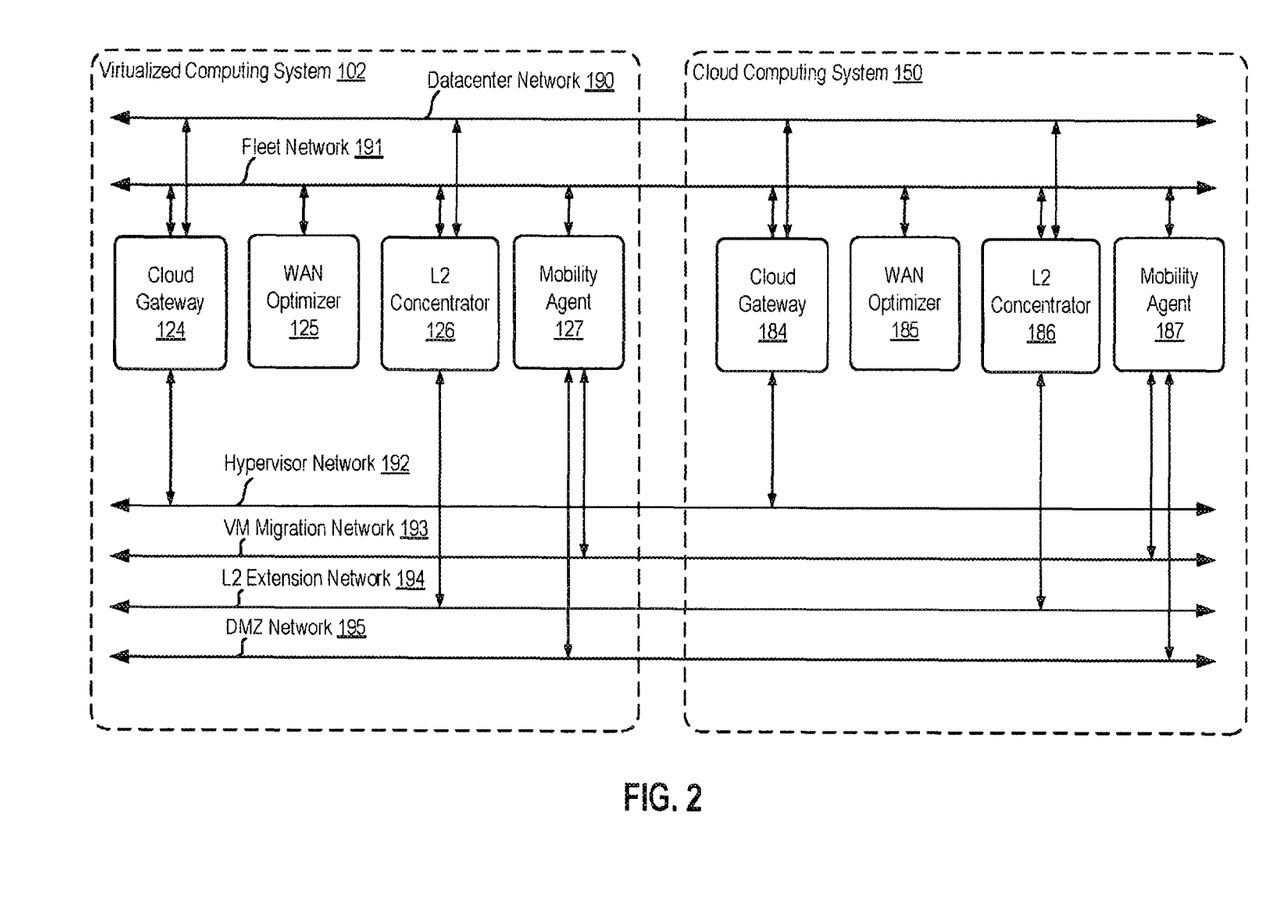
FIG. 2 illustrates example appliances deployed in a hybrid cloud computing system, according to an embodiment.

FIG. 2 illustrates example appliances deployed in hybrid cloud computing system 100, according to an embodiment. The illustrated appliances may include those appliances that are required (or useful) for hybrid operations on the cloud and on-premise sides, i.e., the appliances that provide the WAN fabric between virtualized computing system 102 and cloud computing system 150.

As shown, a gateway 124, a WAN optimizer 125, an L2 concentrator 126, and a mobility agent 127 are deployed on the virtualized computing system 102 side. As discussed, gateway 124 manages external public IP addresses, routes network traffic, and provides networking services for virtualized computing system 102. WAN optimizer 125 increases data transfer efficiencies between on-premise virtualized computing system 102 and cloud computing system 150, L2 concentrator 126 enables L2 networks to be stretched across the WAN, such as that between virtualized computing system 102 and cloud computing system 150. Mobility agent 127 handles VM migration traffic, permitting VMs to be migrated from virtualized computing system 102 to cloud computing system 150 and back. Illustratively, the deployed appliances are connected to various networks 190-195. For example an L2 extension network 194 may be shared by L2 concentrators to create a trunk port. Networks 190-195 may be, e.g., user-specified networks, and in general the user may be permitted to select appliances to deploy and resources to deploy the appliances on as well as networks to connect to. One embodiment may attempt to provide cloud tenants with resource, security, and performance isolation from other tenants, and this is specifically applicable for data path components such as gateways, WAN optimizers, and edge devices. As such, the gateway, WAN optimizer, L2 concentrator, mobility agent, edge, and/or other devices may be grouped together by tenant. One instance of each appliance may be deployed per tenant or, alternatively, multiple instances of each appliance may be deployed for high availability purposes.

Illustratively, a corresponding gateway 184, a corresponding WAN optimizer 185, a corresponding L2 concentrator 186, and a corresponding mobility agent 187 are deployed on the cloud computing system 150 side. That is, the same grouping of appliances is provided on the cloud computing system 150 side, and the group of appliances may generally be associated with a cloud tenant. The gateways, WAN optimizers, L2 concentrators, and mobility agents on the virtualized computing system 102 and cloud computing system 150 sides may further be wired together to communicate via secure encrypted tunnels, where appropriate. As discussed in greater detail below, the appliances 124-127 may first be deployed on virtualized computing system 102 by hybrid cloud manager 132, and hybrid cloud manager 132 may then send remote jobs to hybridity director 174 on the cloud computing system 150 side to deploy corresponding appliances 184-187. Similarly, jobs may be used to configure the corresponding appliances by sharing the configuration states on the virtualized computing system 102 side. Each job includes a set of tasks to be performed within hybrid cloud computing system 100, as discussed in U.S. patent application Ser. No. 14/839,180, entitled Hybrid Task Framework and filed on Aug. 28, 2015, which is incorporated by reference herein in its entirety. Tasks are small units of work that accomplish a focused goal or set of goals. For deployment and configuration of appliances, a management job may be run with tasks that include persisting the deployment configuration, bootstrapping the infrastructure deployment and configuration on the local and remote ends of the connection (e.g., creating a mirror image topology to bootstrap a software-defined WAN connectivity model with gateway appliances.), triggering local and remote appliance deployment jobs, persisting the deployed appliance details, configuring the deployed appliances with default initial configurations (or some other configurations), as discussed in greater detail below.

Figure 3:
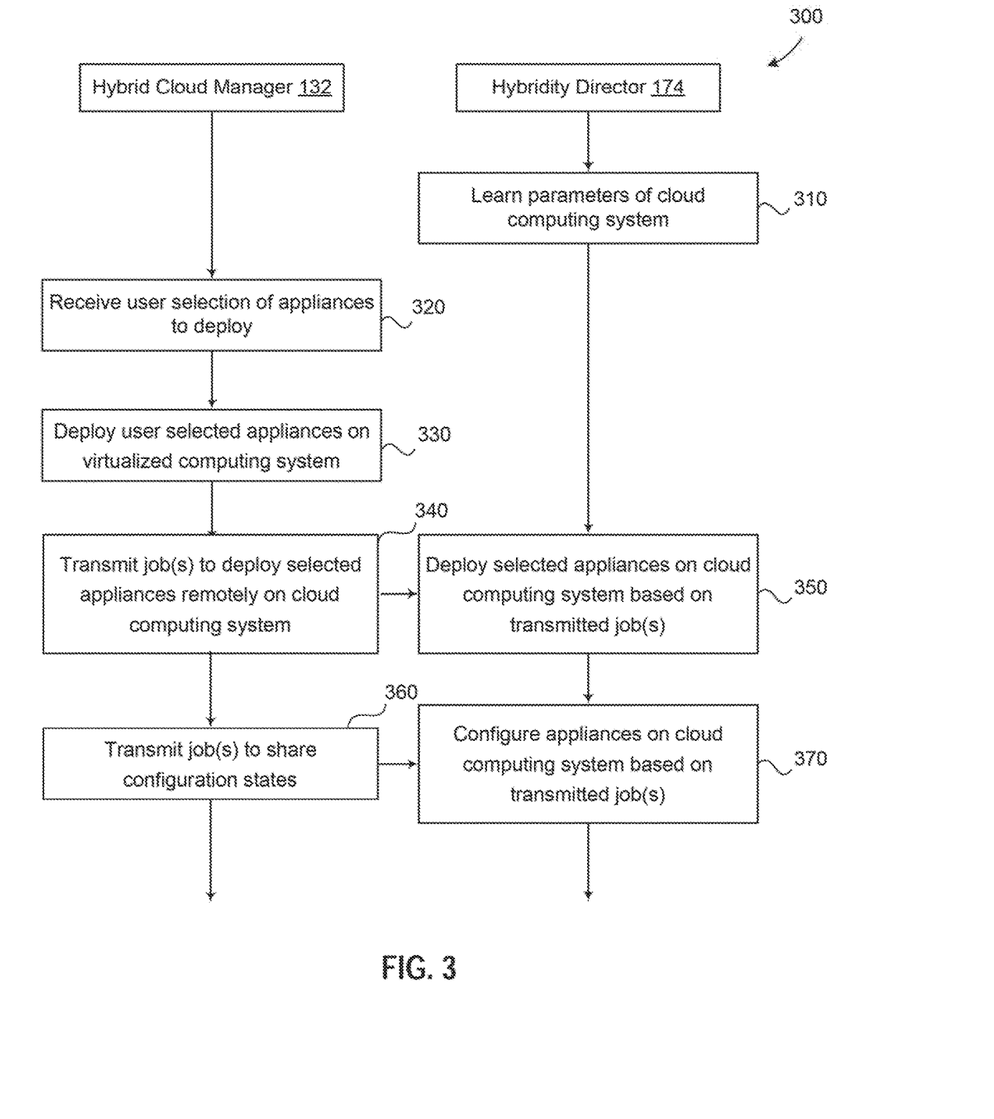
FIG. 3 illustrates a method for deploying appliances in a hybrid cloud computing system, according to an embodiment.

FIG. 3 illustrates a method 300 for deploying appliances in a hybrid cloud computing system, according to an embodiment. As shown, the method 300 begins at step 310, where hybridity director 174 learns parameters of cloud computing system 150. Adapters in cloud computing system 150 may track and monitor changes in the underlying infrastructure. As used herein, "adapters" refers to southbound connections to external systems, and some adapters (e.g., the vCenter® Inventory Service from VMware, Inc.) may track and monitor infrastructure changes. For example, the adapters may maintain a list of what versions of software are compatible with what features, such as an enumerated list including a bit vector specifying versions and their associated configurations, among other things. For example, it may be known that for XYZ version of a hypervisor, or ABC generation of CPU hardware, etc., a corresponding form factor of the appliance should be deployed, and hybridity director 174 may then generate a dependency matrix indicating the jobs or workflows needed to deploy a number of appliances given the various dependencies.

In general, dependencies may include version dependencies, connectivity type dependencies, and physical infrastructure or hardware dependencies. Each such dependency is recorded by hybridity director 174 in the dependency matrix so that an appropriate action in each circumstance may be taken by firing a particular job. That is, the dependency matrix is akin to a state machine in which traversing each path based on environmental conditions leads to a corresponding action and job to perform the action. It should be understood that the dependency matrix may also specify actions to take to maintain, update, and ultimately decommission appliances in response to user-initiated or system events after initial deployment of appliances, as discussed in greater detail below.

At step 320, hybrid cloud manager 132 receives a user selection of appliances to deploy. As discussed, appliances to deploy may include one or more of a gateway, a WAN optimizer, an L2 concentrator, and a VM mobility agent, among others. One or more instances of such appliances may be deployed for each client virtual data center/cloud tenant. In addition to selecting the appliances to deploy, the user may also be asked to select parameters of the deployment, such a datastore and host or cluster to deploy an appliance on, a network to attach the appliance to, an IP range to assign to the appliance, among other things. It should be understood that the particular deployment parameters may depend on the type of appliance being deployed, and deployment of some appliances may not require specifying any parameters. In one embodiment, the user may be provided with a user interface (UI) such as a wizard to select desired appliances, resources on which to enable services which are VMs in this case), and the like. In such a case, hybrid cloud manager 132 may maintain a pre-populated list of which services are on which appliance and what resources each appliance's configuration is dependent on, and the UI may present options to the user based on these constraints. For example, the UI may ask the user for certain resources if a given service is selected for deployment.

Then, at step 330, hybrid cloud manager 132 deploys the selected appliances on virtualized computing system 102. In one embodiment, hybrid cloud manager 132 generates and runs a management job with deployment parameters specified by the user. Hybrid cloud manager 132 may first make placement calculations and, in particular, create a deployment model and a number of appliances that need to be deployed. For every service selected by the user, a separate appliance(s) may be modeled along with its connections to required resources (e.g., virtual switch, datacenter, cluster, datastore, networks, etc.). In addition, hybrid cloud manager 132 may merge models to obtain consolidated appliances. The merger may consider various aspects including an inventory which is maintained by adapters and indicates underlying virtual infrastructure layers and tracks changes of software-defined datacenter components (virtual machines, network, storage, etc.). For example, if the network, datastore, and cluster for two appliances are the same, then the two appliances can be merged into one appliance. This assumes the two services are available in a single appliance. Hybrid cloud manager 132 may further try to fill other deployment parameters by filtering them to a required minimum set. It should be understood that techniques disclosed herein are not limited to any specific deployment model, so long as it is possible to connect from hybridity director 174 to these underlying components.

After making the placement calculation, hybrid cloud manager 132 generates and runs a management job to make the placement. The management job may includes multiple subworkflows performing tasks such as persisting the deployment configuration, bootstrapping the infrastructure deployment and configuration on each end of the connection (local and remote), triggering local and remote appliance deployment jobs, persisting the deployed appliance details, and configuring the deployed appliances with default initial configurations (or some other configurations). Such a job is posted to a queue where workers can pick up the job and perform the tasks, such as deploying VMs on adapters. In one embodiment, the workers may be services that listen for jobs of specific job types, at specific states. When a job associated with a particular service reaches a state associated with that service, a job manager pushes that job to the particular service for execution. The service may also post status updates back to the job queue until completion, at which time the next subworkflow is executed by another service.

In one embodiment, the subworkflows may further include an attribute, also referred to herein as a dependency graph, which specifies whether the subworkflow is independent or dependent on other things. As discussed, dependencies may be based on software versions, connectivity type, or physical infrastructure or hardware, among other things. Hybrid cloud manager 132 is configured to build such dependency graphs so that parent workflows and their dependencies are specified in the job, even if the components do not directly talk to each other. During execution of the job, leaf nodes of the dependency graph may be processed first before parent nodes are processed, working up the stack. It should be understood that independent workflows may be executed in parallel, whereas workflows dependent on other actions cannot be executed in parallel with workflows they depend on. As a result, hybrid cloud manager 132 (or hybridity director 174) may determine from the dependency graph which actions to perform first, which actions to perform subsequently, and which tasks can be performed in parallel. For example, a gateway may need to be deployed first, after which a WAN optimizer and an L2 concentrator may be deployed in parallel and thereafter all of the components can be configured serially. Such dependencies may be built into the management job via the dependency graph attributes specifying which subworkflows of the job depend on other subworkflows.

An example job definition in JSON depicting states, allowed transitions, a workflow, and subworkflows, for deploying appliances in a hybrid cloud computing environment, is shown in Table 1:

TABLE 1

```
{
    jobType: 'FleetManagementJob'
    , workflowType: 'deployAll'
    , states:[
        {
            state: 'BEGIN'
            , allowedTransitions:['PERSIST_CONFIG']
        }
        , {
            state: 'PERSIST_CONFIG'
            , fromTransitions:['BEGIN']
            , allowedTransitions:['DEPLOY_APPLIANCE']
            , subflow: {
                jobType: 'FleetManagementJob'
                ,workflowType: 'persistFleetConfig'
            }
        }
        , {
            state: 'DEPLOY_APPLIANCE'
            , fromTransitions:['PERSIST_CONFIG']
            , allowedTransitions:['UPDATE_INITIAL_CONFIG']
            , subflow: {
                jobType: 'FleetDeploymentJob'
                ,workflowType: 'deployAppliance'
            }
        }
        , {
            state: 'UPDATE_INITIAL_CONFIG'
            , fromTransitions:['PERSIST_CONFIG']
            , allowedTransitions:['PERSIST_FLEET']
            , subflow: {
                jobType: 'FleetManagementJob'
                ,workflowType: 'initializeGateway'
            }
        }
        , {
            state: 'PERSIST_FLEET'
            , fromTransitions:['UPDATE_INITIAL_CONFIG']
            , allowedTransitions:['COMPLETED']
            , subflow: {
                jobType: 'FleetManagementJob'
                ,workflowType: 'persistFleetConfig'
            }
        }
        , {
            state: 'COMPLETED'
            , fromTransitions:['PERSIST_FLEET']
        }
    ]
}
```

At step 340, hybrid cloud manager 132 transmits job(s) to deploy the appliances remotely on cloud computing system 150. As discussed, the triggering of a remote deployment job may be one of the subworkflows of the initial management job. Hybridity director 174 is responsible for managing the remote job, which has tasks that are executed by services on the cloud computing system 150 side to deploy the appliances at step 350. In one embodiment, one appliance at a time may be deployed on the virtualized computing system 102 side and then on the cloud computing system 150 side unless deployment in parallel is permitted.

At step 360 remote job(s) are employed to share configuration states with hybridity director 150. In turn, hybridity director 174 configures appliances on the cloud computing system 150 side based on the shared configuration states at step 370. Depending on the configuration on the on-premise virtualized computing system 102, corresponding configurations may be made on the cloud computing system 150 side. Example configurations may include whether there is a private line, whether the appliances face the internet, the versions of the appliances, and the like. As another example, a bidirectional handshake may be desired for security purposes, and the job framework discussed above may be used to share a cryptographic key generated by a service on the virtual data center side 102 with a service on the cloud computing system 150 side, thereby enabling the bidirectional handshake. Then, a tunnel (e.g., as an Internet Protocol Security (IPsec) tunnel) may be autonegotiated with birectional trust. Accordingly, secure encrypted tunnels may be established wiring pairs of appliances on the virtualized computing system 102 and the cloud computing system 150 together.

Figure 4:
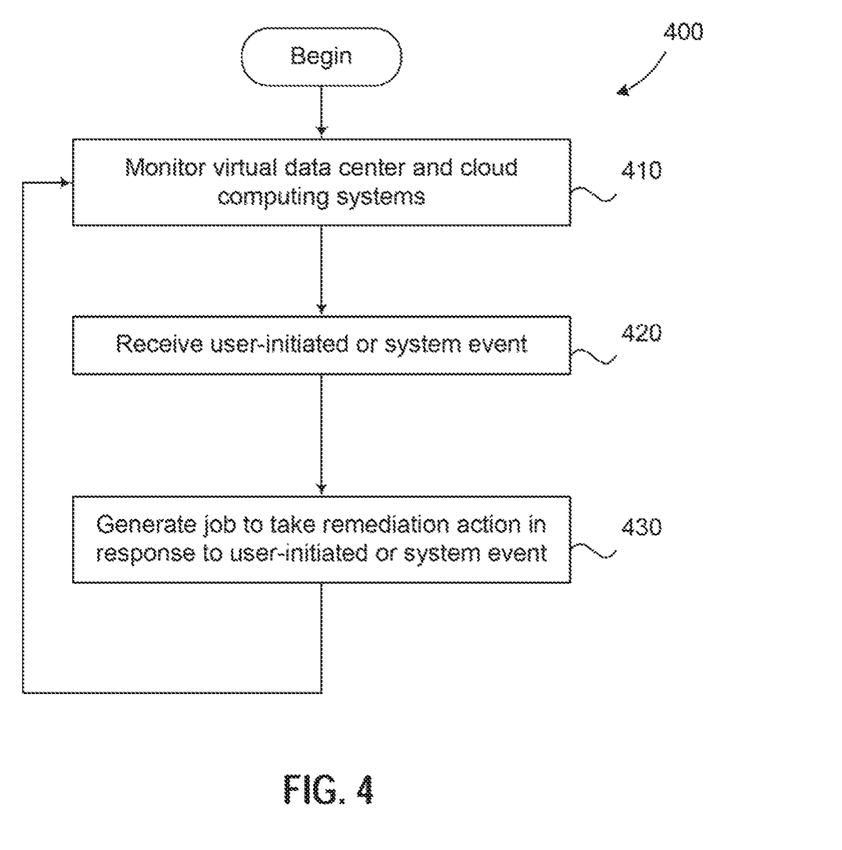
FIG. 4 illustrates a method for maintaining appliances deployed in a hybrid cloud computing system, according to an embodiment.

FIG. 4 illustrates a method 400 for maintaining appliances deployed in a hybrid cloud computing system, according to an embodiment. In general, service instances may be created during initial deployment, and user-specified parameters may then be injected to configure the services. Thereafter, there may be a monitoring stage and, finally, a tear-down stage in which configurations on service appliances using a given service instance are destroyed. Method 400 is directed to the monitoring stage.

As shown, the method begins at step 410, where hybrid cloud manager 132 or hybridity director 174 monitors virtualized computing system 102 or cloud computing system 150, respectively, for system and user-initiated events. Hybrid cloud manager 132 and hybridity director 174 are configured to continuously monitor for such events. In one embodiment, hybrid cloud manager 132 and hybridity director 174 may initiate heartbeat jobs after deploying each appliance to listen to appliance events.

At step 420, hybrid cloud manager 132 or hybridity director 174 receives a system or user-initiated event. User-initiated events may include a user specifying, via a UI or API, an additional appliance to deploy, a reconfiguration or upgrade to an appliance or to a set of appliances, decommissioning an existing appliance, redeployment of an appliance, among other things. System events may include failure states that require remediation. For example, a tunnel may go down, CPU resources provided to an appliance may be low, etc.

At step 430, hybrid cloud manager 132 or hybridity director 174 generates an appropriate job in response to the system or user event. In the case of a reconfiguration or upgrade to an appliance, hybrid cloud manager 132 or hybridity director 174 determines, based on the dependency matrix table discussed above, an appropriate job to fire. For example, as appliances are upgraded, hybrid cloud manager 132 or hybridity director 174 may push new versions of configurations to one appliance and only then to another appliance, based on the dependency matrix. In the case of a failure state, hybrid cloud manager 132 or hybridity director 174 fires a job with remediation tasks specific to the failure state. For example, if a tunnel goes down, then hybrid cloud manager 132 or hybridity director 174 may generate a job that remediates the tunnel, synchronizes the connection states between gateways, among other things. As another example, if an appliance is starved for CPU resources, hybrid cloud manager 132 or hybridity director 174 may give more CPU resources to the appliance, or not, depending on the type of appliance involved, as specified by the dependency matrix.

Advantageously, techniques disclosed herein permit appliances to be deployed, given one set of user inputs, in both an on-premise virtualized computing system and on a public cloud computing system based on a learned cloud environment. The dependency matrix disclosed herein provides a mechanism for automatically collating dependencies, and the dependency graphs ensure that the dependencies are maintained, even at scale. Deployed appliances may further be monitored and remediation actions taken, where appropriate.

The various embodiments described herein may employ various computer-implemented operations involving, data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating, system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as to single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for deploying appliances in a hybrid cloud computing system including a data center and a public cloud, the method comprising:
    learning parameters of an environment of the public cloud;
    receiving a user selection of appliances to deploy in the hybrid cloud computing system;
    deploying the selected appliances on the data center;
    transmitting one or more jobs to deploy corresponding appliances remotely on the public cloud;
    deploying the corresponding appliances on the public cloud based on the one or more jobs and the learned parameters; and
    sharing configuration states for the selected appliances and the corresponding appliances between the data center and the public cloud.

2. The method of claim 1, wherein the selected appliances deployed on the data center and the corresponding appliances deployed on the public cloud are the same types of appliances.

3. The method of claim 1, wherein the shared configuration states include one or more cryptographic keys, and the method further comprises, performing one or more bidirectional handshakes using the one or more cryptographic keys.

4. The method of claim 3, further comprising, performing auto-negotiation to establish one or more tunnels between the selected appliances deployed on the data center and the corresponding appliances deployed on the public cloud.

5. The method of claim 1, further comprising:
    monitoring the deployed selected appliances and the deployed corresponding appliances; and
    in response to a user-initiated or system event, generating additional jobs to handle the user-initiated or system event.

6. The method of claim 5, wherein the event is one of a reconfiguration or upgrade to one of the selected appliances or to a set of the selected appliances, decommissioning of one or more of the selected appliances, redeployment of one or more of the selected appliances, or a failure state.

7. The method of claim 1, further comprising, generating a dependency matrix which indicates jobs to fire in response to particular events based on at least one of version dependencies, connectivity type dependencies, and physical infrastructure or hardware dependencies.

8. The method of claim 1,
    wherein deploying the selected appliances on the data center includes executing a job, and
    wherein a subworkflow of the executed job includes transmitting the one or more jobs to deploy the corresponding appliances remotely on the public cloud.

9. The method of claim 1, wherein the selected appliances include at least one of a gateway, a wide area network (WAN) optimizer, a level 2 (L2) concentrator, and a virtual machine (VM) migration agent.

10. A non-transitory computer-readable storage medium comprising instructions for deploying appliances in a hybrid cloud computing system including a data center and a public cloud by performing operations comprising:
    learning parameters of an environment of the public cloud;
    receiving a user selection of appliances to deploy in the hybrid cloud computing system;
    deploying the selected appliances on the data center;
    transmitting one or more jobs to deploy corresponding appliances remotely on the public cloud;
    deploying the corresponding appliances on the public cloud based on the one or more jobs and the learned parameters; and
    sharing configuration states for the selected appliances and the corresponding appliances between the data center and the public cloud.

11. The non-transitory computer-readable storage medium of claim 10, wherein the selected appliances deployed on the data center and the corresponding appliances deployed on the public cloud are the same types of appliances.

12. The non-transitory computer-readable storage medium of claim 10, wherein the shared configuration states include one or more cryptographic keys, and the operations further comprise performing one or more bidirectional handshakes using the one or more cryptographic keys.

13. The non-transitory computer-readable storage medium of claim 12, the operations further comprising, performing auto-negotiation to establish one or more tunnels between the selected appliances deployed on the data center and the corresponding appliances deployed on the public cloud.

14. The non-transitory computer-readable storage medium of claim 10, the operations further comprising:
    monitoring the deployed selected appliances and the deployed corresponding appliances; and
    in response to a user-initiated or system event, generating additional jobs to handle the user-initiated or system event.

15. The non-transitory computer-readable storage medium of claim 14, wherein the event is one of a reconfiguration or upgrade to one of the selected appliances or to a set of the selected appliances, decommissioning of one or more of the selected appliances, redeployment of one or more of the selected appliances, or a failure state.

16. The non-transitory computer-readable storage medium of claim 10, the operations further comprising, generating a dependency matrix which indicates jobs to fire in response to particular events based on at least one of version dependencies, connectivity type dependencies, and physical infrastructure or hardware dependencies.

17. The non-transitory computer-readable storage medium of claim 10,
    wherein deploying the selected appliances on the data center includes executing a job, and
    wherein a subworkflow of the executed job includes transmitting the one or more jobs to deploy the corresponding appliances remotely on the public cloud.

18. The non-transitory computer-readable storage medium of claim 10, wherein the selected appliances include at least one of a gateway, a wide area network (WAN) optimizer, a level 2 (L2) concentrator, and a virtual machine (VM) migration agent.

19. A system, comprising:
    a memory; and
    a processor storing one or more applications, which, when executed on the processor, perform operations for deploying appliances in a hybrid cloud computing system including a data center and a public cloud, the operations comprising:
        learning parameters of an environment of the public cloud,
        receiving a user selection of appliances to deploy in the hybrid cloud computing system,
        deploying the selected appliances on the data center,
        transmitting one or more jobs to deploy corresponding appliances remotely on the public cloud,
        deploying the corresponding appliances on the public cloud based on the one or more jobs and the learned parameters, and
        sharing configuration states for the selected appliances and the corresponding appliances between the data center and the public cloud.

20. The system of claim 19, wherein the shared configuration states include one or more cryptographic keys, and the operations further comprise:
    performing one or more bidirectional handshakes using the one or more cryptographic keys; and
    performing auto-negotiation to establish one or more tunnels between the selected appliances deployed on the data center and the corresponding appliances deployed on the public cloud.

* * * * *